(12) United States Patent
Dobranic

(10) Patent No.: US 11,630,959 B1
(45) Date of Patent: *Apr. 18, 2023

(54) VISION-BASED TEXT SENTIMENT ANALYSIS AND RECOMMENDATION SYSTEM

(71) Applicant: Delta Campaigns, LLC, Las Vegas, NV (US)

(72) Inventor: Alexander Dobranic, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,101

(22) Filed: Oct. 18, 2021

Related U.S. Application Data (63) Continuation of application No. 16/809,855, filed on Mar. 5, 2020, now Pat. No. 11,194,971.

(51) Int. Cl.
| | |
|---|---|
| *G06F 40/30* | (2020.01) |
| *G06T 11/00* | (2006.01) |
| *G06V 10/40* | (2022.01) |
| *G06V 30/10* | (2022.01) |

(52) U.S. Cl.
CPC .............. *G06F 40/30* (2020.01); *G06T 11/00* (2013.01); *G06V 10/40* (2022.01); *G06T 2200/24* (2013.01); *G06V 30/10* (2022.01)

(58) Field of Classification Search
CPC ...... G60F 40/30; G06K 9/49; G06K 2209/01; G06T 11/00; G06T 2200/24
See application file for complete search history.

(56) References Cited

U.S. PATENT DOCUMENTS

| | | |
|---|---|---|
| 5,519,608 A | 5/1996 | Kupiec |
| 8,825,515 B1 | 9/2014 | Hanson |
| 8,862,460 B2 | 10/2014 | Cai et al. |
| 9,071,579 B1 | 6/2015 | Bender |
| 9,195,640 B1 | 11/2015 | Donneau-Golencer et al. |
| 9,262,688 B1 | 2/2016 | Zadeh |
| 9,336,268 B1 | 5/2016 | Moudy et al. |
| 9,473,448 B2 | 10/2016 | Ives et al. |
| 9,633,005 B2 | 4/2017 | Danielyan et al. |
| 9,646,198 B2 | 5/2017 | Cunico et al. |
| 9,665,563 B2 | 5/2017 | Min et al. |
| 9,781,392 B2 | 10/2017 | Sahay et al. |
| 9,792,277 B2 | 10/2017 | Srinivasan |
| 9,857,946 B2 | 1/2018 | Chowdhury et al. |
| 9,978,362 B2 | 5/2018 | Dolan et al. |
| 10,050,926 B2 | 8/2018 | Ebersman et al. |
| 10,078,725 B2 | 9/2018 | Kalafut et al. |
| 10,120,859 B2 | 11/2018 | Parikh et al. |
| 10,191,905 B2 | 1/2019 | Kuznetsov |
| 10,216,850 B2 | 2/2019 | Kazi et al. |

(Continued)

*Primary Examiner* — Kevin Ky (74) *Attorney, Agent, or Firm* — Goldstein Law Offices, P.C.

(57) ABSTRACT

A vision-based system for identifying textual sentiment present in a text source image, comprising a camera module adapted to capture the text source image, and a vision-based text analyzing device adapted to analyze the input image, identify a text input string, and determine the sentiment embodied by the text input string, the vision-based text analyzing device is further adapted to revise the text input string to embody an alternate sentiment, the vision-based system has an output display for presenting sentiment classification results and the revised text string via in an augmented reality format.

15 Claims, 8 Drawing Sheets

(56) References Cited

U.S. PATENT DOCUMENTS

| | | | |
|---|---|---|---|
| 10,224,038 | B2 | 3/2019 | Bostick et al. |
| 10,230,835 | B2 | 3/2019 | Bostick et al. |
| 10,262,290 | B1 | 4/2019 | Mossoba et al. |
| 10,297,273 | B2 | 5/2019 | Akkiraju et al. |
| 10,303,768 | B2 | 5/2019 | Divakaran et al. |
| 10,303,771 | B1 | 5/2019 | Jezewski |
| 10,311,069 | B2 | 6/2019 | Allen et al. |
| 10,347,293 | B1 | 7/2019 | Skinner et al. |
| 10,798,484 | B1 * | 10/2020 | Coover .................. G06N 20/00 |
| 10,805,696 | B1 * | 10/2020 | Suiter ................... H04W 4/185 |
| 10,878,819 | B1 * | 12/2020 | Chavez .................. G10L 15/25 |
| 10,922,490 | B2 * | 2/2021 | Jain ....................... H04L 51/063 |
| 10,956,948 | B2 * | 3/2021 | Mediratta ........... G06Q 30/0643 |
| 11,194,971 | B1 * | 12/2021 | Dobranic ............... G06V 10/40 |
| 2009/0058860 | A1 | 3/2009 | Fong et al. |
| 2010/0153210 | A1 | 6/2010 | Oh et al. |
| 2011/0099052 | A1 | 4/2011 | Brun et al. |
| 2014/0298364 | A1 | 10/2014 | Stepanov et al. |
| 2014/0344712 | A1 * | 11/2014 | Okazawa ............... G06Q 50/01 715/752 |
| 2015/0194146 | A1 | 7/2015 | Wu et al. |
| 2015/0286627 | A1 | 10/2015 | Chang et al. |
| 2016/0063993 | A1 * | 3/2016 | Dolan ................... G06F 40/279 704/254 |
| 2016/0071119 | A1 | 3/2016 | Blanchflower et al. |
| 2016/0117591 | A1 | 4/2016 | Naik |
| 2017/0052946 | A1 | 2/2017 | Gu et al. |
| 2017/0140240 | A1 | 5/2017 | Socher |
| 2017/0242913 | A1 | 8/2017 | Tijssen et al. |
| 2017/0322923 | A1 * | 11/2017 | Dixon ....................... G06N 3/08 |
| 2018/0032508 | A1 | 2/2018 | Matskevich et al. |
| 2018/0160055 | A1 | 6/2018 | Taine et al. |
| 2018/0203851 | A1 | 7/2018 | Wu |
| 2018/0225306 | A1 | 8/2018 | He et al. |
| 2018/0239815 | A1 | 8/2018 | Yi et al. |
| 2018/0253416 | A1 | 9/2018 | Crouse et al. |
| 2018/0268287 | A1 | 9/2018 | Johansen et al. |
| 2018/0336972 | A1 | 11/2018 | Carbonell et al. |
| 2018/0373696 | A1 | 12/2018 | Terry et al. |
| 2018/0373697 | A1 * | 12/2018 | Jain ........................ G06F 40/247 |
| 2018/0375947 | A1 | 12/2018 | Hodges et al. |
| 2019/0043487 | A1 | 2/2019 | Rivkin |
| 2019/0087414 | A1 | 3/2019 | Narayanan et al. |
| 2019/0122412 | A1 | 4/2019 | Woo et al. |
| 2019/0147060 | A1 | 5/2019 | Lau |
| 2019/0163807 | A1 * | 5/2019 | Jain ........................ G06F 40/30 |
| 2019/0179900 | A1 | 6/2019 | Wang et al. |
| 2019/0188590 | A1 | 6/2019 | Wu et al. |
| 2019/0297042 | A1 * | 9/2019 | Prabhu ............... G06F 3/04842 |
| 2020/0065381 | A1 * | 2/2020 | Chui ..................... G06F 40/253 |
| 2020/0210521 | A1 * | 7/2020 | Hutchins ............... G06F 16/986 |
| 2020/0272819 | A1 * | 8/2020 | Beller .................... G06F 3/0304 |
| 2020/0320592 | A1 * | 10/2020 | Soule .................... G06V 20/20 |
| 2020/0372544 | A1 * | 11/2020 | Moskowitz ........ G06Q 30/0277 |
| 2020/0380951 | A1 * | 12/2020 | Vuppaladhadiam ........................ H04M 3/42391 |
| 2020/0402313 | A1 * | 12/2020 | Yerli .................... G06T 19/006 |
| 2020/0409454 | A1 * | 12/2020 | Kuh ...................... G06F 3/0484 |

\* cited by examiner

VISION-BASED TEXT SENTIMENT ANALYSIS AND RECOMMENDATION SYSTEM

CROSS REFERENCE TO RELATED APPLICATIONS

This application is a continuation of non-provisional patent application Ser. No. 16/809,855 filed in the United States Patent Office on Mar. 5, 2020, claims priority therefrom, and is expressly incorporated herein by reference in its entirety.

TECHNICAL FIELD

The present disclosure relates generally to a system utilizing computer vision to identify text and determine textual sentiments embodied therein. More particularly, the present disclosure relates to a vision-based system for identifying textual sentiment within the text source, generating recommendations for revising the text source, and displaying identified sentiments and recommendations via an augmented reality display.

BACKGROUND

Written communications, especially communications conducted electronically, are becoming increasingly commonplace, often supplanting telephone conversations and face to face interactions. An individual authoring a piece of writing, such as an e-mail, text message, or even a handwritten letter, may wish to receive feedback about general or specific sentiments contained within their writing. As it is difficult, if not impossible, for a writer to clear up misunderstandings if the reader interprets the writing in a way other than the writer's actual intentions, it is vital that the writer be able to understand if what they are writing embodies the writer's intended tone or emotional sentiment. For example, the writer may wish to understand whether their writing is passive-aggressive, assertive, aggressive, or passive. At other times, the writer may wish to identify strongly worded language written while the writer was upset or agitated, which the writer does not wish the potential reader to see. Once the sentiments within the writing have been identified, the writer will benefit from receiving recommendations for revising the writing to accurately reflect the writer's intentions.

Although many systems for analyzing text and identifying sentiments can be found within the prior art, these systems lack the capability to function with any text source by visually identifying and analyzing text through computer vision. Instead, existing systems require a user to have the sentiment analysis software running concurrently on the same computing device being used to compose their writing. In many cases, the user is required to transfer or otherwise entirely retype the text of the writing to the sentiment analysis software. Additionally, there are no simple solutions for analyzing hand-written text, as existing systems would require the hand-written text to be manually digitized in a cumbersome, multi-step process, or be retyped for analysis. As the process of writing often requires uninterrupted concentration, users will often forgo the benefits of sentiment analysis and recommendations rather than perform the time-consuming and inefficient steps required to interact with existing sentiment analysis systems.

A need therefore exists for a vision-based system capable of visually analyzing any text source to produce sentiment analysis and recommendations in real-time, and presenting the analyses and recommendations via augmented reality overlays superimposed over the original text, thus providing a fast and seamless experience for the user.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for visually identifying textual sentiment present within a text source using computer vision. Accordingly, the present disclosure provides a vision-based system comprising a camera module and a vision-based text analyzing device. The camera module is adapted to scan a text source image containing a text content item which embodies a sentiment, and produce an input image duplicating the text source image. The vision-based text analyzing device is adapted to analyze the text source image, extract a text input string corresponding to the text content item, and identify the sentiment embodied in the text input string.

It is another aspect of an example embodiment in the present disclosure to provide a system capable of revising the text to embody an alternate sentiment. Accordingly, the vision-based text analyzing device is adapted to interpret the meaning of the text input string, and generate a revised text string which retains the meaning of the text input string but embodies the alternate sentiment.

It is yet another aspect of an example embodiment in the present disclosure to provide a system capable of displaying the identified sentiment and the revised text to a user via an augmented reality format. Accordingly, the vision-based text analyzing device has an output display, and is adapted to generate an augmented reality overlay containing the identified sentiment or the revised text string, which is then superimposed over the input image to create an augmented reality output image via the output display.

It is a further aspect of an example embodiment in the present disclosure to provide a system capable of integrating revisions with the text source. Accordingly, the text content is generated using a source device executing a source application, and the text source corresponds to a source display. The vision-based system further comprises a revision integration module which operably links the vision-based text analysis device to the source device, allowing the revised text string to be associated with a source text string within the text source which corresponds to the original text content item. The revision integration module further allows the source application to replace the source text string with the revised text string, refreshing the text source image and causing the text source image to reflect the revised text.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
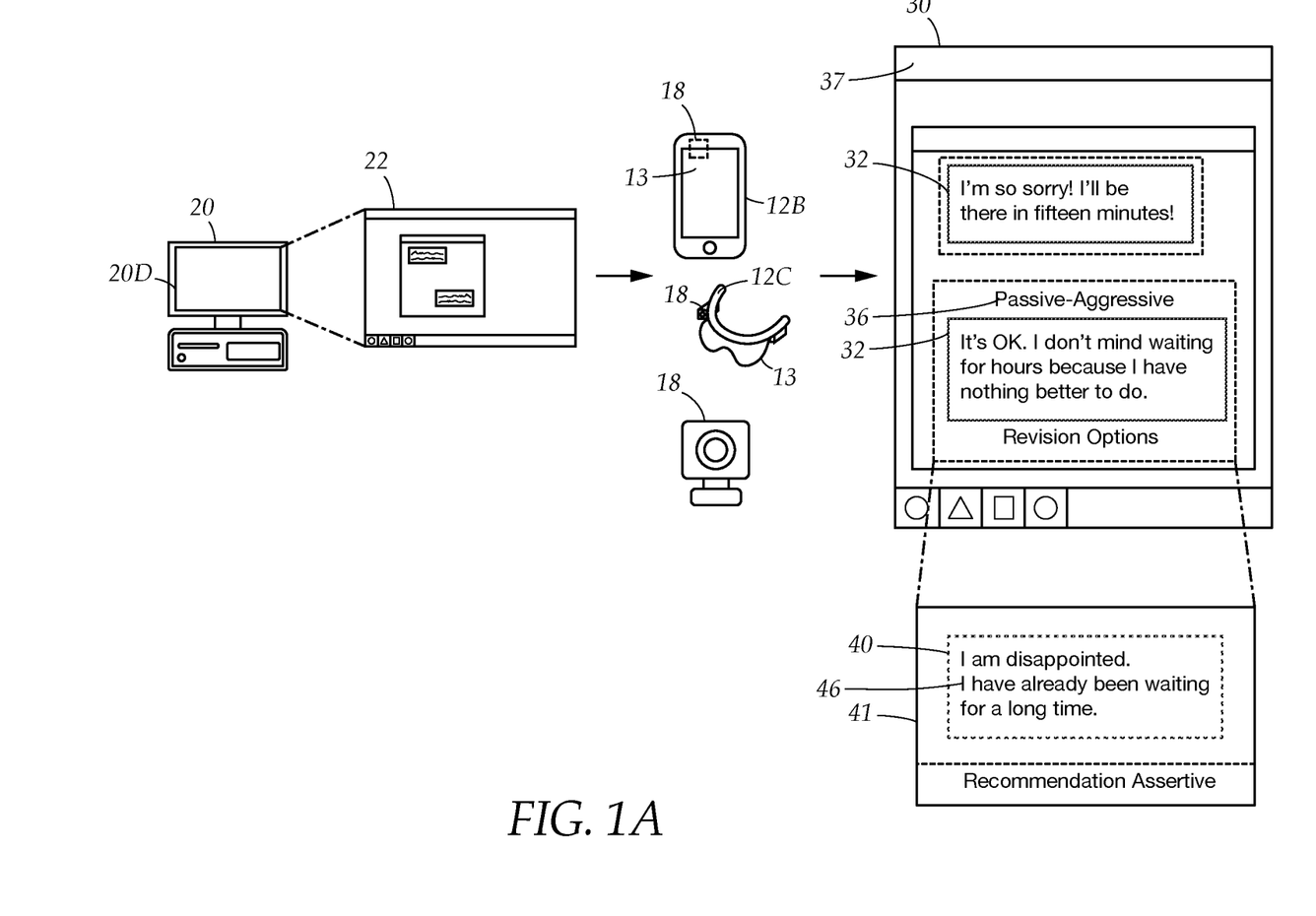
FIG. 1A is block diagram depicting a vision-based system for analyzing sentiment contained within a text source, with a vision-based text analyzing device equipped with a camera which reads the text source and provides sentiment analysis within an output image, in accordance with an embodiment in the present disclosure.
Figure 1B:
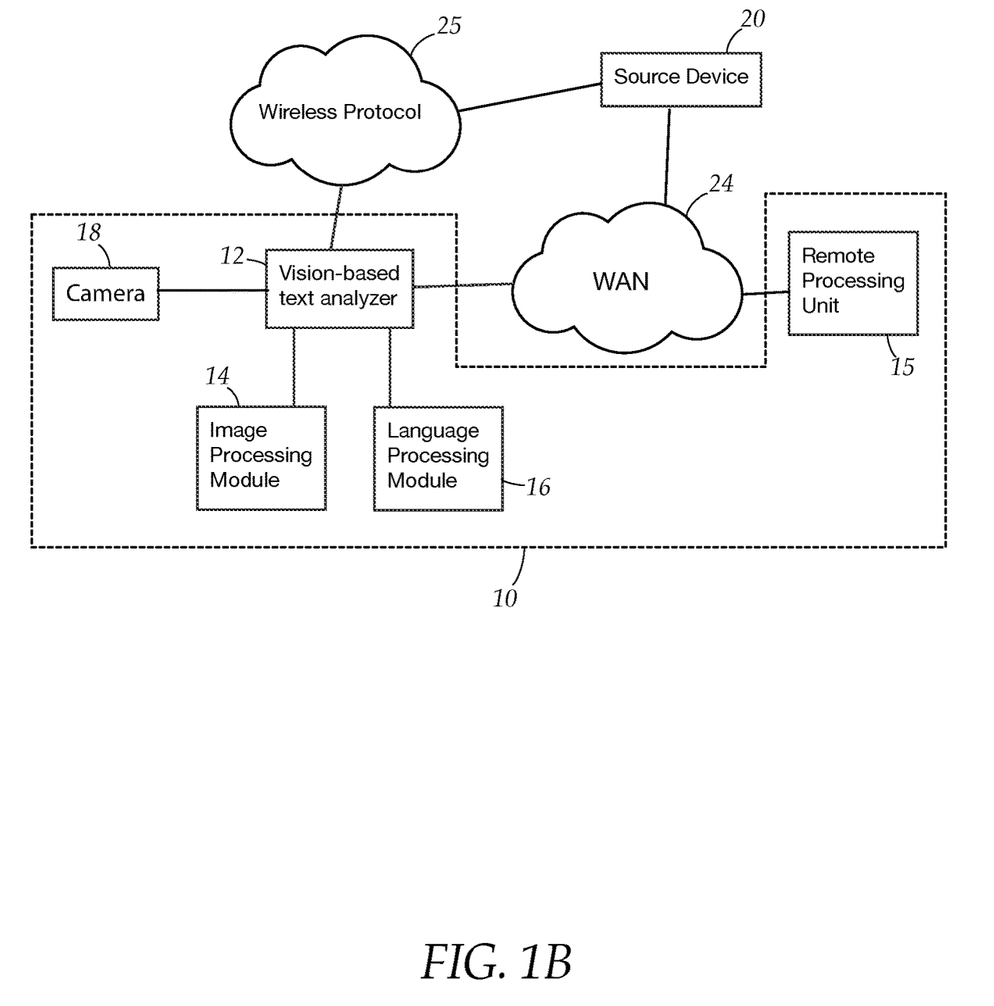
FIG. 1B is a block network diagram showing the vision-based system operably connected to a remote processing unit via a wide area network, in accordance with an embodiment in the present disclosure.

FIGS. 1A-B illustrate a vision-based system 10 for analyzing a text source image 22 using computer vision and identifying sentiments present therein. The vision-based system 10 comprises a camera module 18 configured to read or scan the text source image 22 and generate an input image 30, a vision-based text analyzing device 12 adapted to analyze the input image 30, and an output display 13 adapted to present the results of the analysis to a user. The text source image 22 contains one or more text content items corresponding to sentences, phrases, or paragraphs in a human language, and each text content item embodies a sentiment. Sentiment describes an emotional component of the text content item, and may be identified using a combination of word meaning, context, style, and other indicators. In a preferred embodiment, the sentiment is classified using a plurality of sentiment types, comprising passive, assertive, aggressive, and passive-aggressive sentiment types. The sentiment types may further comprise positive, neutral, and negative emotional tones.

The text source image 22 may be any visual representation of the text content items which can be read or scanned by the camera module 18. For example, the text source image 22 may be embodied as handwriting or printed text on a sheet of paper, or a digital image produced by a source device 20 which is connected to a source device display 20D. The source device 20 may be any computing device or other apparatus capable of generating text. For example, referring to FIG. 1A and FIG. 2, the source device 20 may be a personal computer, and the source device display 20D may be a computer monitor. The text content items may originate from a source application 23, such as a word processor, email or messenger application, or any other application which allows for the generation and editing of text.

The vision-based text analyzing device 12 may be a smartphone 12B, tablet, portable scanner, or other portable computing device in which the camera module 18 is integral to the device. The vision-based text analyzing device 12 may also be a laptop or desktop computer, with either a camera module 18 which is integrated with the device, or which is configured to operate with a detached camera module 18. In certain embodiments, the vision-based text analyzing device 12 may also be a wearable computer, smartwatch, an augmented reality 12C or virtual reality apparatus.

Figure 1C:
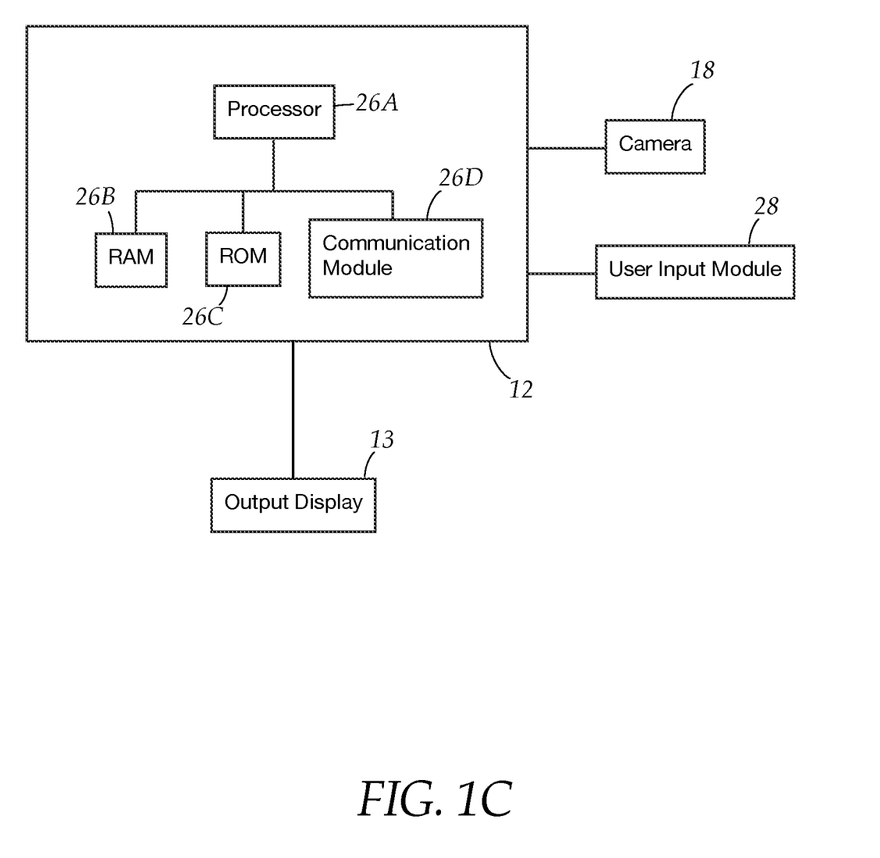
FIG. 1C is a block diagram showing an example architecture of the vision-based text analyzing device, in accordance with an embodiment in the present disclosure.

Turning to FIG. 10 while also referring to FIGS. 1A-B, in one embodiment, the vision-based text analyzing device 12 comprises a processor 26A, a RAM 26B, a ROM 26C, and a communication module 26D. The vision-based text analyzing device 12 is operably connected to the camera module 18. The vision-based system 10 also has a user input module 28 adapted to receive user commands, and may be a touch input component of the output display 13, a keyboard, a voice recognition module, or any other appropriate electronic input device, as will be appreciated by a person of ordinary skill in the art in the field of the invention. The communication module 26D is adapted to allow the transmission and receipt of data via a wide area network (WAN) 24 such as the internet, and may also be equipped with a wireless transceiver capable of communicating with other computing devices via a wireless protocol 25 such as WiFi, Bluetooth, or other protocol suitable for short ranged wireless data communication. The communication module 26D is also capable of communicating with other devices via wired interfaces. The communication module 26D of the vision-based text analyzer device 12 may be configured to communicate with the source device 20 through any of the aforementioned communication means.

The vision-based text analyzing device 12 further has an image processing module 14 and a language analysis module 16, through which the analytical and recommendation processes of the vision-based system 10 are implemented. In certain embodiments, the vision-based system 10 further comprises a remote processing unit 15 such as a cloud server, remote application server, distributed computing platform, or other apparatus capable of remotely performing the functions of the vision-based text analyzing device.

Figure 2:
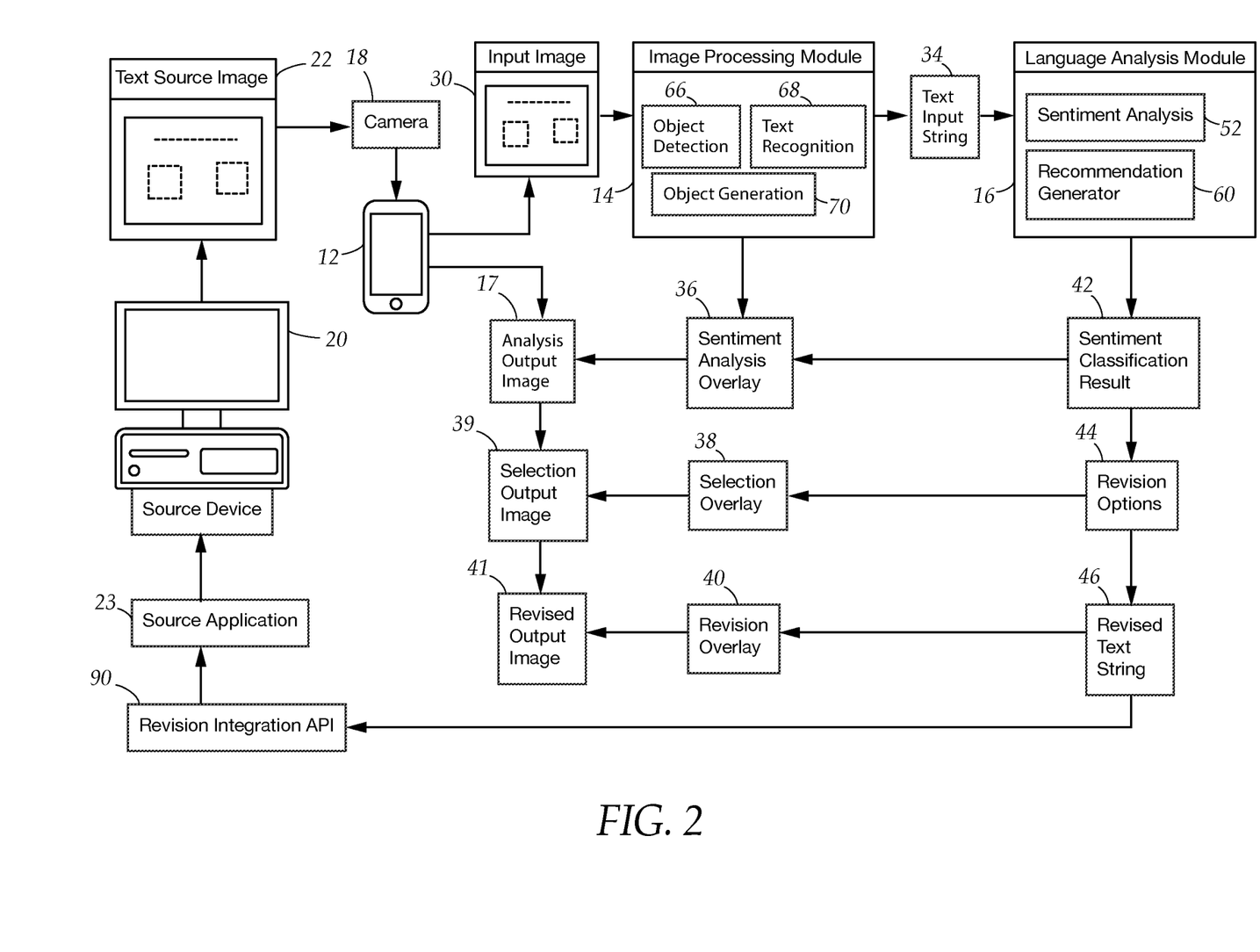
FIG. 2 is a block diagram depicting the operation of an image processing module and a language analysis module which combine sentiment classification results and revision recommendations with overlays, in accordance with an embodiment in the present disclosure.

Referring to FIG. 2 while continuing to refer to FIGS. 1A-B, the vision-based text analyzing device 12 is adapted to analyze the input image 30 in real-time, identify the text content items within the input image 30, and generate a sentiment classification result 42 for each text content item. The input image 30 is a photograph or video frame which reproduces all or a portion of the text source image 22. The image processing module 14 has a text recognition submodule 68 capable of identifying the text content items within the input image 30, and generate a text input string 34 composed of characters which constitute the identified text content item. The language analysis module 16 has a sentiment analysis submodule 52 adapted to analyze the input text string 34, and identify the sentiment type embodied by the input text string 34 to produce the sentiment classification result 42. For example, the sentiment classification result 42 may show that the sentiment type embodied by the text content item is passive-aggressive.

Figure 3:
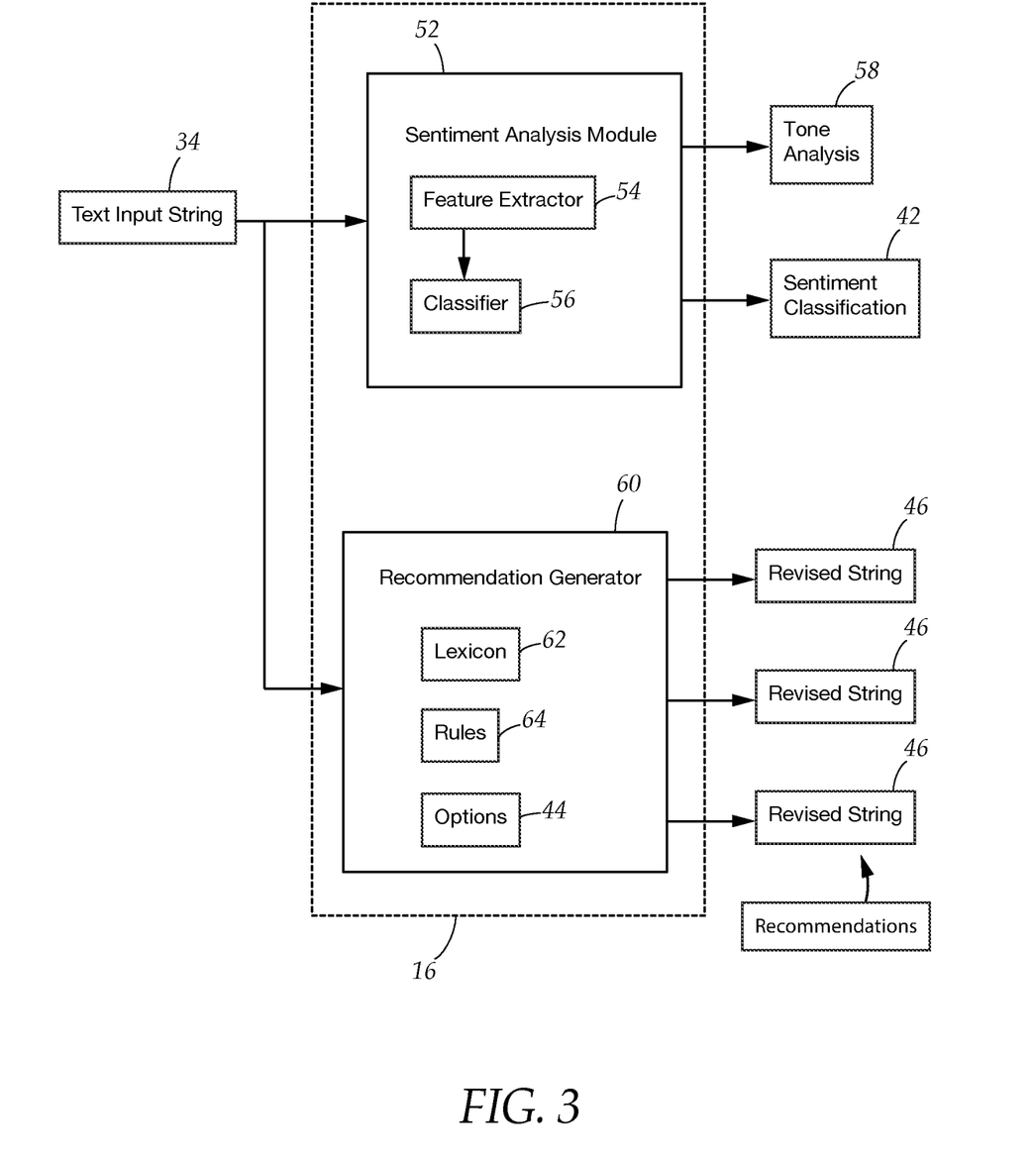
FIG. 3 is a block diagram depicting the operation of the language analysis module, in accordance with an embodiment in the present disclosure.

Turning to FIG. 3 while continuing to refer to FIGS. 1A-B and FIG. 2, the language analysis module 16 may perform sentiment analysis using various natural language processing methods and algorithms, as will be appreciated by a person of ordinary skill in the art. For example, the sentiment analysis submodule 52 may employ machine-learning algorithms, rule-based algorithms, or a combination thereof. In one embodiment, the sentiment analysis submodule 52 may have a feature extractor 54 which converts text strings into one or more feature vectors, and a classifier 56 which applies a model to the feature vectors to identify the sentiment classification 42 embodied by the input text string 34. The sentiment analysis submodule 52 may also produce a tone analysis result 58 which indicates whether the emotion embodied by the input text string is positive, neutral, or negative.

Once the sentiment classification result 42 is determined, the result is presented to the user via the output display 13. In one embodiment, the image processing module 14 further has an object detection submodule 66 which is adapted to map portions of the input image 30 and identify text source objects 32 in which the text content items appear. For example, text source objects 32 may correspond to regions of the input image 30 which surround or otherwise embody the text content items. The image processing module 14 further has an object generation submodule 70 adapted to generate augmented reality graphical objects and effects which are superimposed over the corresponding text source objects 32. The sentiment classification result 42 is superimposed onto the input image 30 to produce an analysis output image 37 which is presented to a user via the output display 13. The sentiment classification result 42 may be presented as text accompanying the analysis overlay 36, and may be positioned adjacent to or on top of the text content items in the input image 30. In certain embodiments, the analysis overlay 36 may also use colors and/or symbols to identify each sentiment type. For example, the analysis overlay 36 may "highlight" the text using a color background according to the sentiment classification result 42. The resulting analysis output image 37 thus constitutes an augmented reality image, which is a composite representation of the original text source image 22 combined with overlays and other data. The object detection submodule 66 and object generation submodule 70 may be implemented using various image analysis and computer graphics algorithms and methods which are known to a person of ordinary skill in the art.

In a preferred embodiment, the input image 30 is continually refreshed by the vision-based system 10 in real-time, and the language analysis module 16 will generate sentiment classification results 42 for newly identified text content items as the camera module 18 scans different portions of the text source image 22 or is directed at a new text source image 22.

Turning to FIG. 3 while continuing to refer to FIGS. 1A-B and FIG. 2, the language analysis module 16 further has a recommendation generator submodule 60 adapted to revise the input text string 34 to generate a revised text string 46 which embodies an alternate sentiment. This allows the user to review text content items within the text source image 22 and revise any text context items which embody a sentiment which is undesirable. As with the sentiment analysis submodule 52, the recommendation generator submodule 60 may be implemented using language processing algorithms and methods as will be appreciated by a person of ordinary skill in the art. For example, the recommendation generator submodule 60 may employ a lexicon 62 and rules 64 in order to interpret the meaning of the input text string 34, and revise the input text string 34 to embody the alternate sentiment. For example (as shown in FIG. 1A), a text content item which is passive-aggressive may be revised or replaced with a revised text string 46 which retains the meaning of the original, but which is assertive in sentiment.

Figure 4A:
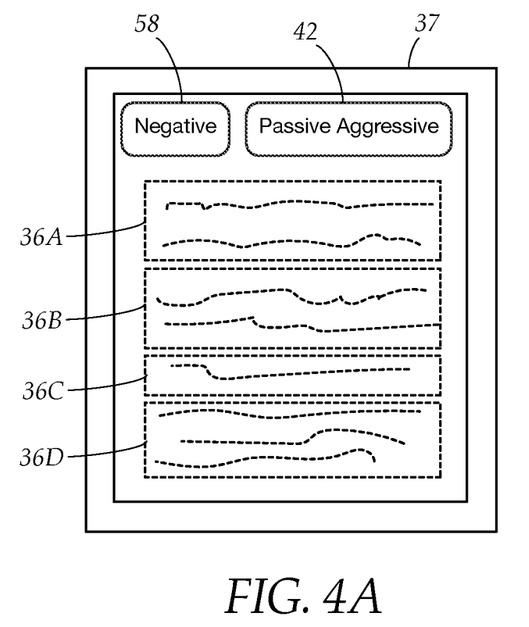
FIG. 4A is a diagrammatical depiction of an analysis output image, further showing an analysis overlay superimposed over the text content, in accordance with an embodiment in the present disclosure.
Figure 4B:
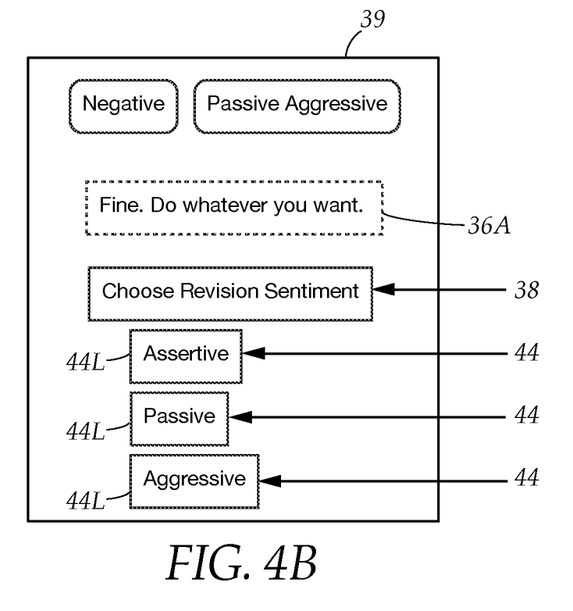
FIG. 4B is a diagrammatical depiction of a selection output image showing a selection overlay with a plurality of revision options, in accordance with an embodiment in the present disclosure.

Turning to FIG. 4B, while also referring to FIGS. 1A-C, FIG. 2, and FIG. 3, the recommendation generator submodule 60 may allow the user to select the desired sentiment type for the alternate sentiment in the augmented reality format. The image processing submodule 14 may generate a selection overlay 38 which includes one or more revision options 44, each marked using a revision option label 44L. The selection overlay 38 is then superimposed over the input image 30, to form a selection output image 39 which is then presented to the user via the output display 13. The user may then select the desired revision option 44 via the user input module 28, such as via a touch input interface. In one embodiment, the selection overlay 38 may also display the revised text string 46 which is associated with each revision option 44, thus allowing the user to preview the revised text strings 46 prior to selecting one of the revisions options 44. In other embodiments, the revision options 44 may be presented using a simple visual prompt or other notification without utilizing the augmented reality aspect of the selection overlay 38.

The selected revised text string 46 may be presented to the user via the output display, in a manner which allows the revised text string 46 to be viewed against the original text source image 22. The object generation submodule 70 creates a revision overlay 40 containing the revised text string 46, which is then superimposed over the text source object associated with the text input string 34, as identified by the object detection submodule 66. The revision overlay 40 and the input image 30 are then combined to create a revised output image 41, which is presented to the user via the output display 13. In certain embodiments, the text source object 32 which contains the original text input string 34 is covered partially or completely by the revision overlay 40, forming a background against which the revised text string 46 to be clearly visible.

Referring to FIG. 4A, while also referring to FIGS. 1A-C and FIG. 2, the vision-based text analysis device 12 is adapted to allow multiple text input strings 34 present within the input image 30 to be analyzed simultaneously. In one example (as shown in FIG. 4A), the input image 30 contains four separate text input strings 34. Each of the text input strings 34 is marked using a separate analysis overlay 36A, 36B, 36C, 36D. The vision-based text analyzer device 12 may allow the user to select one of the text input strings 34 for revision, such as by tapping or otherwise denoting the appropriate analysis overlay using the user input module 28.

Furthermore, the output display 13 may simultaneously present a mixture of analysis, selection, or revision overlays 36, 38, 41, allowing the user to revise certain text input strings 34 while continuing to view the analysis overlay 36 of an unrevised text input string 34.

Figure 5A:
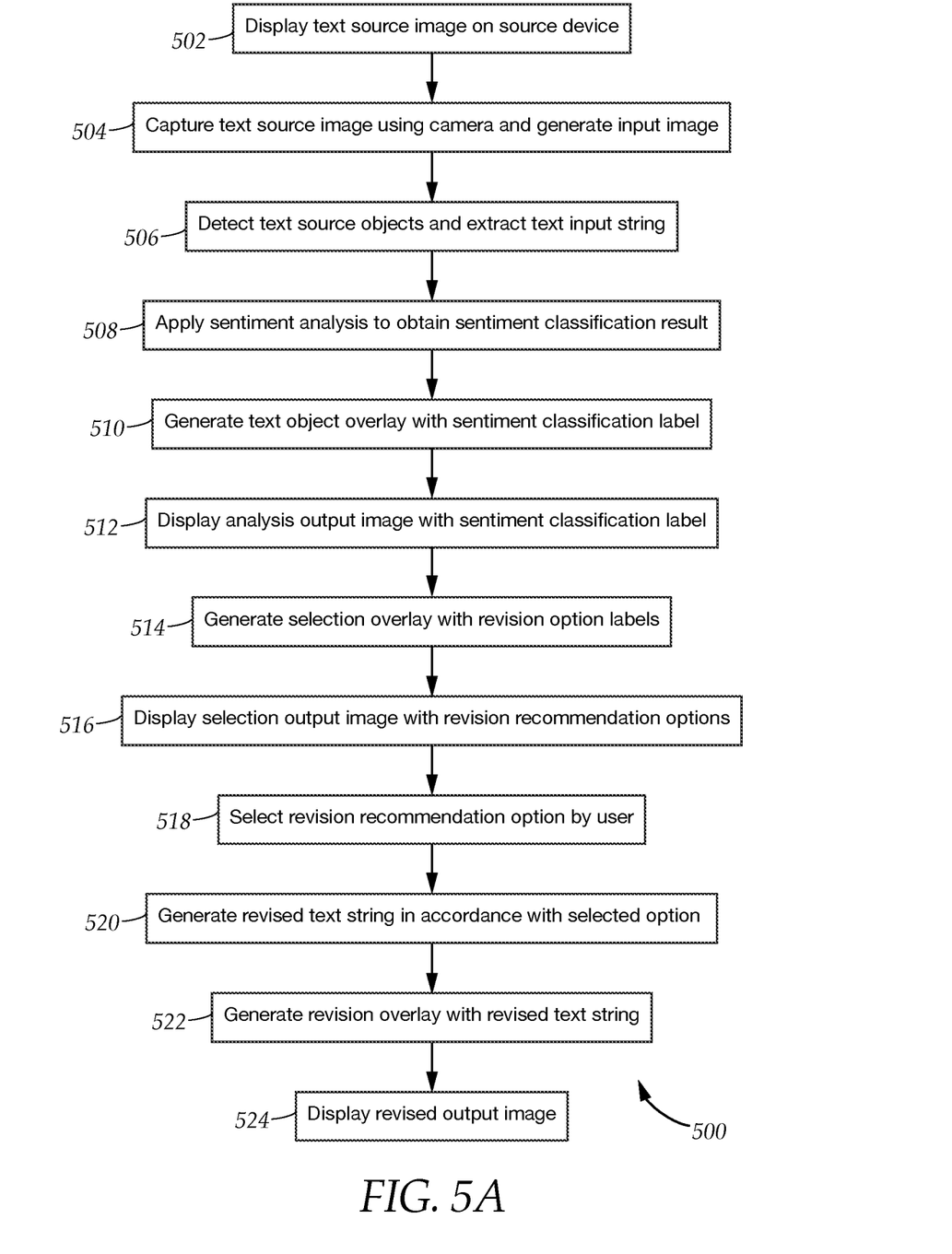
FIG. 5A is a flowchart depicting an example sentiment analysis and recommendation process, in accordance with an embodiment in the present disclosure.

Turning to FIG. 5A, while also referring to FIGS. 1A-C and FIG. 2, the key functions of the vision-based system 10 may be summarized using an exemplary sentiment analysis and recommendation process 500. At step 502, a text source image 22 containing a text content item is generated by the source device 20 and is displayed via the source display device 20D. At step 504, the user orients the camera module 18 of the vision-based system 10 at the text source image 22, and the camera module 18 captures the text source image 22 and generates an input image 30. Next, at step 506, the input image 30 is passed to the image processing module 14, which detects the text content item and its associated text source object 32, and extracts a text input string 34. At step 508, the text input string 34 is passed to the language analysis module 16, and is processed by the sentiment analysis submodule 52 to determine a sentiment classification result which describes the sentiment type embodied by the text input string 34. Next, the image processing module 14 generates an analysis overlay 36 containing the sentiment classification result at step 510. At step 512, the image processing module 14 generates an analysis output image 39 which combines the analysis overlay 36 with the input image 30, and presents the analysis output image 39 to the user via the output display 13.

At step 514, the image processing module 14 proceeds to generate a selection overlay 38 containing a plurality of revision options 44, with each revision option 44 reflecting an alternate sentiment which the input text string 34 can be revised to embody. The selection overlay 38 is combined with the input image 30 to form a selection output image 39, which is presented to the user via the output display 13 at step 516. Next, at step 518, the user selects one of the revision options 44 presented via the selection overlay 38, and the language analysis module 16 generates a revised text string 46 which retains the meaning of the text input string 34 but which embodies the alternate sentiment at step 520. Next, at step 522, the image processing module 14 generates a revision overlay 40 containing the revised text string 46, and creates a revised output image 41 which combines the revision overlay 40 with the input image 30.

Figure 5B:
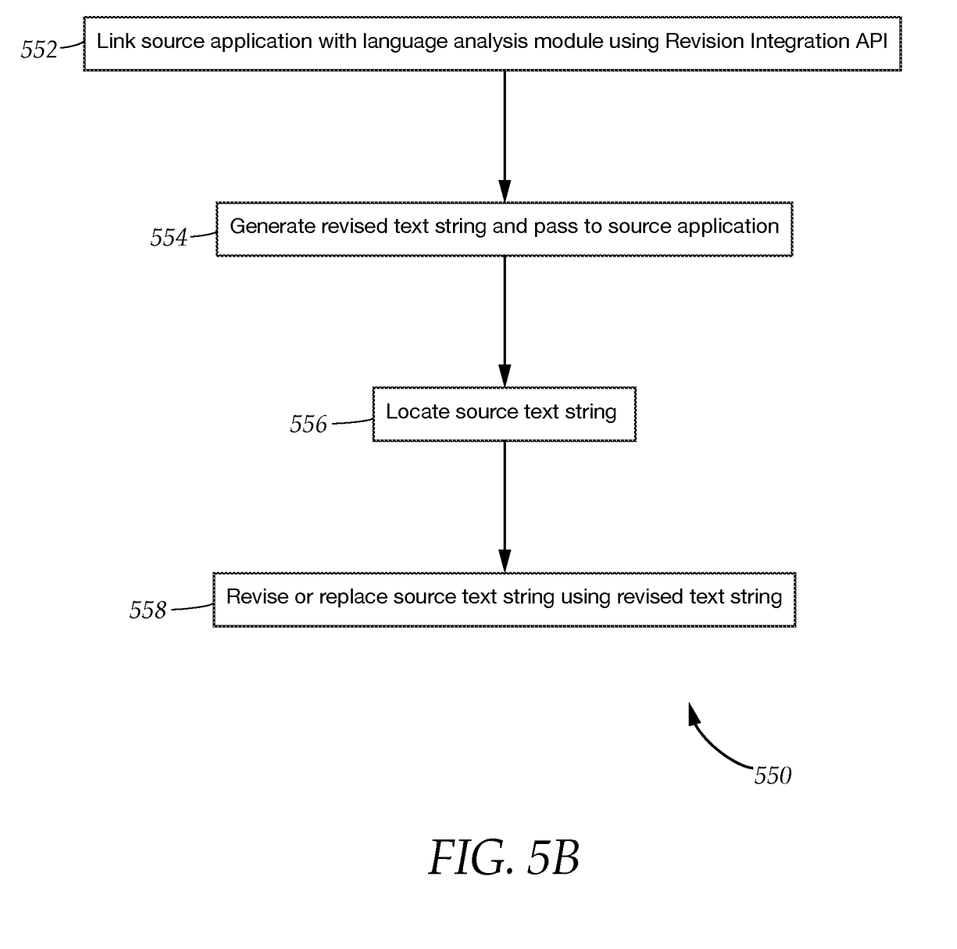
FIG. 5B is a flowchart depicting an example revision integration process, in accordance with an embodiment in the present disclosure.

Turning now to FIG. 5B, while also referring to FIGS. 1A-C and FIG. 2, the vision-based system 10 further allows the revised text strings 46 to be directly transferred to the source device 20, thus allowing the text source image 22 to be refreshed to reflect the revised text string 46. The vision-based system 10 therefore may include a revision integration module, implemented as a revision integration API 90 (application programming interface), which forms an operable link between the vision-based text analyzer device 12 and the source application 23. The revision integration module allows each revised text string 46 to be matched with the original text content item which was generated using the source application 23 and presented via the source device display 20D. In an exemplary revision integration process 550, the process is initiated by first establishing communication between the language analysis module 16 and the source application 23 at step 552. Next, the revised text string 46 is communicated to the source application 23 at step 554. At step 556, the revised text string 46 is linked to a source text string corresponding to the text content item present in the original text source image 22. Finally, at step 558, the source application replaces the source text string with the revised text string 46. The text source image 22 is then refreshed to reflect the integrated revision. Note that the steps presented in FIGS. 5A-B reflect exemplary processes, and may be altered, rearranged, or omitted while remaining in adherence with the principles of the present disclosure.

In certain embodiments, the revised text strings 46 may be exported as a digital file along with the entire text content of the text source image 22 in text string form, thus allowing the vision-based system 10 to create a duplicate of the original text along with any revisions which have been introduced.

Turning to FIG. 1A while also referring to FIG. 2, in embodiments where the vision-based text analyzing device 12 is implemented as a wearable augmented reality headset 12C, the output display 13 may correspond to a transparent plastic or glass lens which is interposed between the text source image 22 and the user's field of view. The camera module 18 may be positioned and calibrated such that the input image 30 closely corresponds to what the user perceives. When the analysis, selection, or revision output images 37, 39, 41 are generated, any portion said images may be rendered with reduced opacity, thus allowing the user to perceive a composite image in which the augmented reality analysis, selection, or revision overlays 36, 38, 40 are accurately superimposed over the appropriate text content items contained within the text source image 22, without obstructing the user's view thereof.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a vision-based text sentiment analysis and recommendation system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A vision-based system for analyzing a text source, the text source having text content, the text content contains a meaning and embodies one of a plurality of sentiment types, the system comprising:
   a camera module adapted to view the text source and generate an input image;
   a vision-based text analyzing device having an output display and an input module adapted to receive user input;
   an image processing module adapted to receive the input image and detect a text source object within the input image which contains the text content, and convert the text content to a text input string; and a language processing module adapted to analyze the text input string and generate a sentiment classification result describing the sentiment type embodied by the text content, whereby the image processing module is adapted to generate a sentiment analysis overlay containing the sentiment classification result, and present a sentiment analysis output image via the output display which combines the input image and the sentiment analysis overlay;

the image processing module is further adapted to generate a selection overlay with a plurality of revision options each corresponding to one of the sentiment types other than the sentiment classification result, and present a selection output image via the output display which combines the selection overlay with the input image, allowing a user to select one of the revision options; and the language analysis module further has a recommendation generator submodule adapted to analyze the text input string and generate a revised text string embodying an alternate sentiment which reflects the selected revision option, and the image processing module is further adapted to present the revised text string via the output display of the vision-based text analyzing device.

2. The vision-based system as described in claim 1, wherein:

the image processing module is further adapted to generate a revision overlay containing the revised text string and present a revision output image which combines the revision overlay with the input image via the output display of the vision-based text analyzing device, whereby the revision overlay is superimposed over the text source object.

3. The vision-based system as described in claim 2, wherein:

the sentiment types comprise positive, neutral, and negative sentiments.

4. The vision-based system as described in claim 2, wherein:

the selection overlay displays a revision option label identifying the sentiment type of each revision option.

5. The vision-based system as described in claim 2, wherein the text source object is generated using a source device with a source display, and the text content is generated using a source application, and the vison-based system further comprises a revision integration module, the revision integration module forms an operable link between the vision-based system and the source application, allowing the text content within the text source to be replaced with the revised text string.

6. The vision-based system as described in claim 5, wherein the camera module and the vision-based text analyzing device are adapted to refresh the input image and generate the analysis output image, the selection output image, and the revision output image in real-time in an augmented reality format.

7. The vision-based system as described in claim 6, wherein the output display is transparent, allowing the analysis output image, the selection output image, and the revision output image to be superimposed over the text source image by placing the output display between the user and the text source image.

8. The vision-based system as described in claim 7, wherein the vision-based text analyzing device is adapted to be worn by the user.

9. A method for analyzing a text source image having text content and matching the text content to one of a plurality of sentiment types, the text content is generated using a source application implemented on a source device, the text source image is displayed using a source device display linked to the source device, the method comprising the steps of:

providing a camera module;

providing a vision-based text analyzing device having an output display, an image processing module, and a language analysis module;

orienting the camera module towards the source device display;

scanning the text source image using the camera module and generating an input image which duplicates the text source image;

identifying the text content within the input image using the image processing module and converting the text content into a text input string;

analyzing the text input string using the language analysis module, and generating a sentiment classification result describing the sentiment type embodied by the text input string;

presenting the sentiment classification result to the user via the output display of the vision-based text analyzing device;

creating a selection overlay with a plurality of revision options each corresponding to one of the sentiment types other than the sentiment classification result, generating an augmented reality selection output image by combining the selection overlay with the input image, and presenting the augmented reality selection output image to the user via the output display;

selecting one of the revision options by the user;

generating a revised text string based on the text input string using the language analysis module, embodying an alternate sentiment in the revised text string which corresponds to the selected revision option; and presenting the revised text string to the user via the output display.

10. The method as recited in claim 9, wherein:

the step of analyzing the text input string is followed by the step of creating a sentiment analysis overlay containing the sentiment classification result, and superimposing the sentiment analysis overlay over the input image to create an augmented reality analysis output image; and the step of presenting the sentiment classification result further comprises presenting the augmented reality analysis output image to the user via the output display.

11. The method as recited in claim 10, wherein the step of analyzing the text input string further comprises determining the sentiment type from a list comprising passive, assertive, aggressive, and passive-aggressive sentiments.

12. The method as recited in claim 10, wherein the step of analyzing the text input string further comprises determining the sentiment type from a list comprising positive, neutral, and negative sentiments.

13. The method as recited in claim 10, wherein:

the step of generating a revised text string is followed by the step of creating a revision overlay containing the revised text string, and combining the revision overlay with the input image to generate an augmented reality revision output image; and the step of presenting the revised text string to the user further comprises presenting the augmented reality revision output image containing the revised text string to the user.

14. The method as recited in claim 13, wherein:
the step of analyzing the text input string is followed by the step of identifying a text source object corresponding to a portion of the input image in which the text content is located; and
the step of creating a revision overlay further comprises superimposing the revision overlay over the input image to cover the text source object.

15. The method as recited in claim 14, wherein:
the step of providing a vision-based text analyzing device is followed by the step of providing a revision integration module; and
the step of presenting the revised text string to the user is followed by the step of operably connecting the vision-based text analyzing device to the source application using the revision integration module, identifying a source text string corresponding to the text content within the text source image, passing the revised text string to the source application, replacing the source text string with the revised text string, and refreshing the text source image to reflect the revised text string.

* * * * *